Jan. 7, 1964 H. H. SIGLER ETAL 3,116,896
COMBINATION HELICOPTER-AUTOMOBILE
Filed April 5, 1961 3 Sheets-Sheet 3
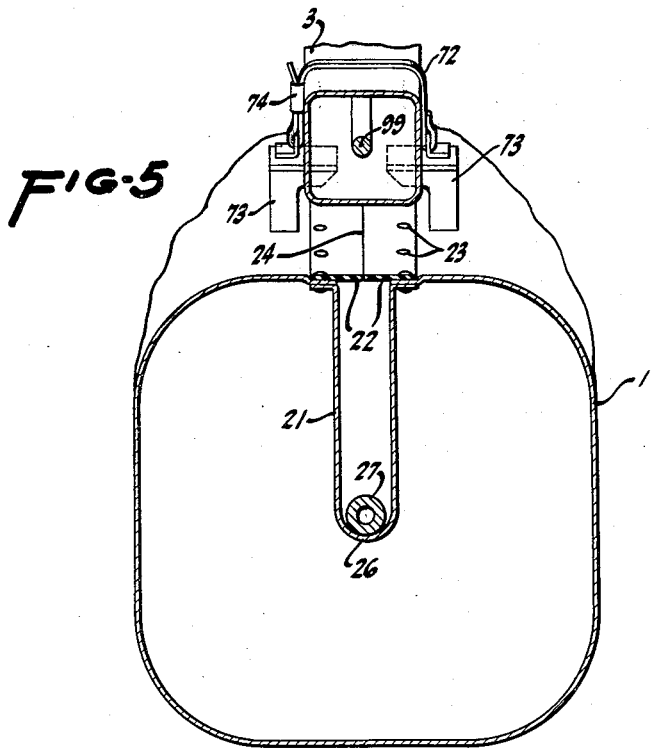
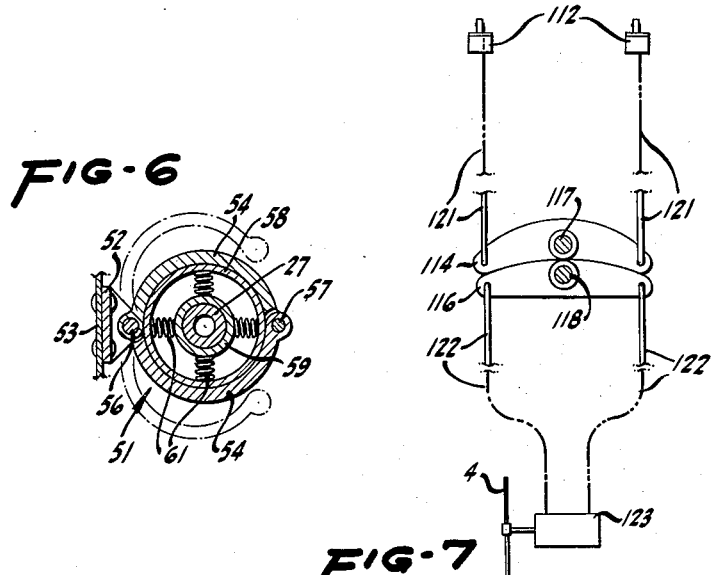
INVENTORS
HAROLD H. SIGLER
JOSEPH STUART III
BY
Bialos + Schlemmer
ATTORNEYS

United States Patent Office 3,116,896
Patented Jan. 7, 1964

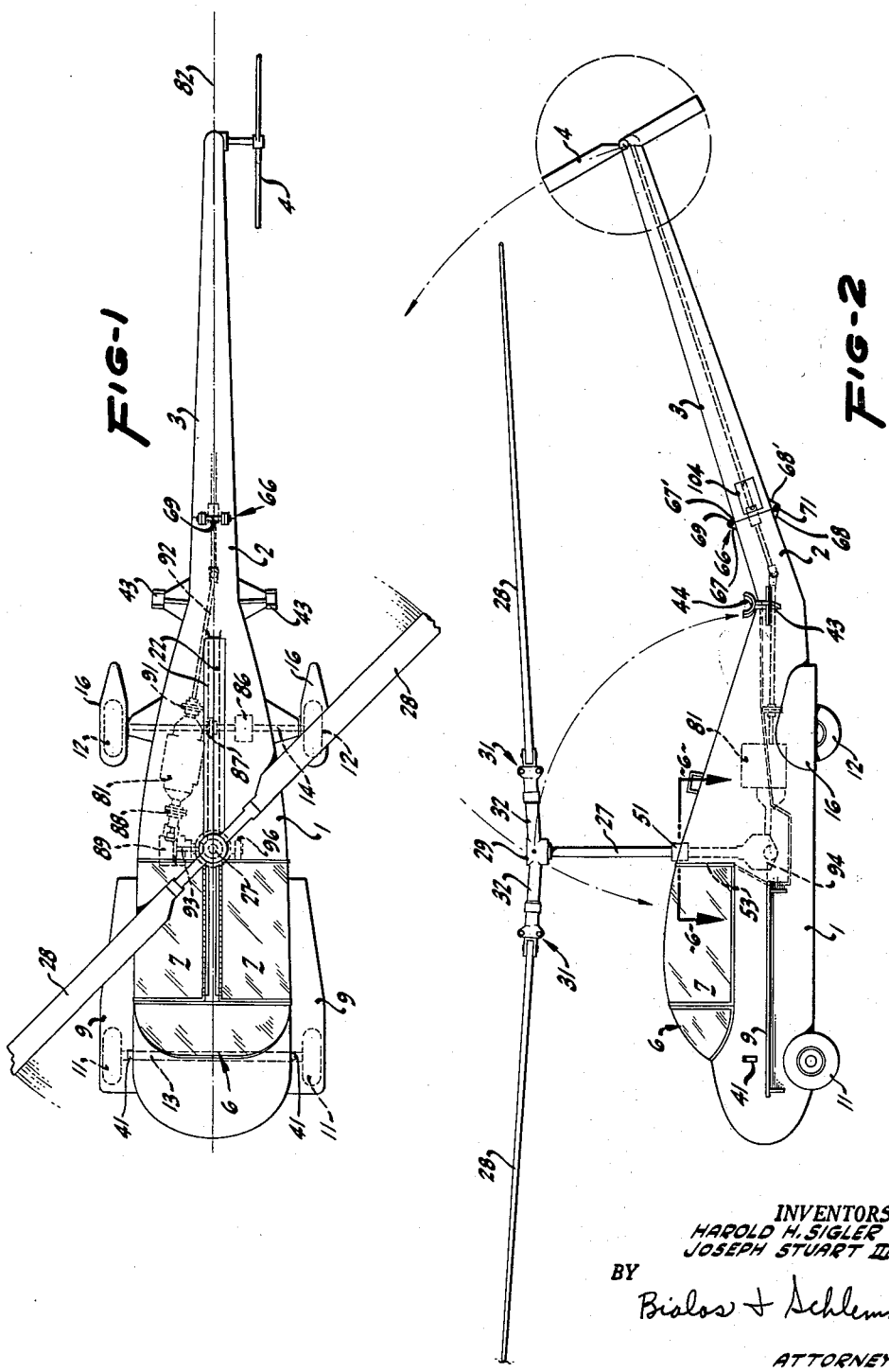

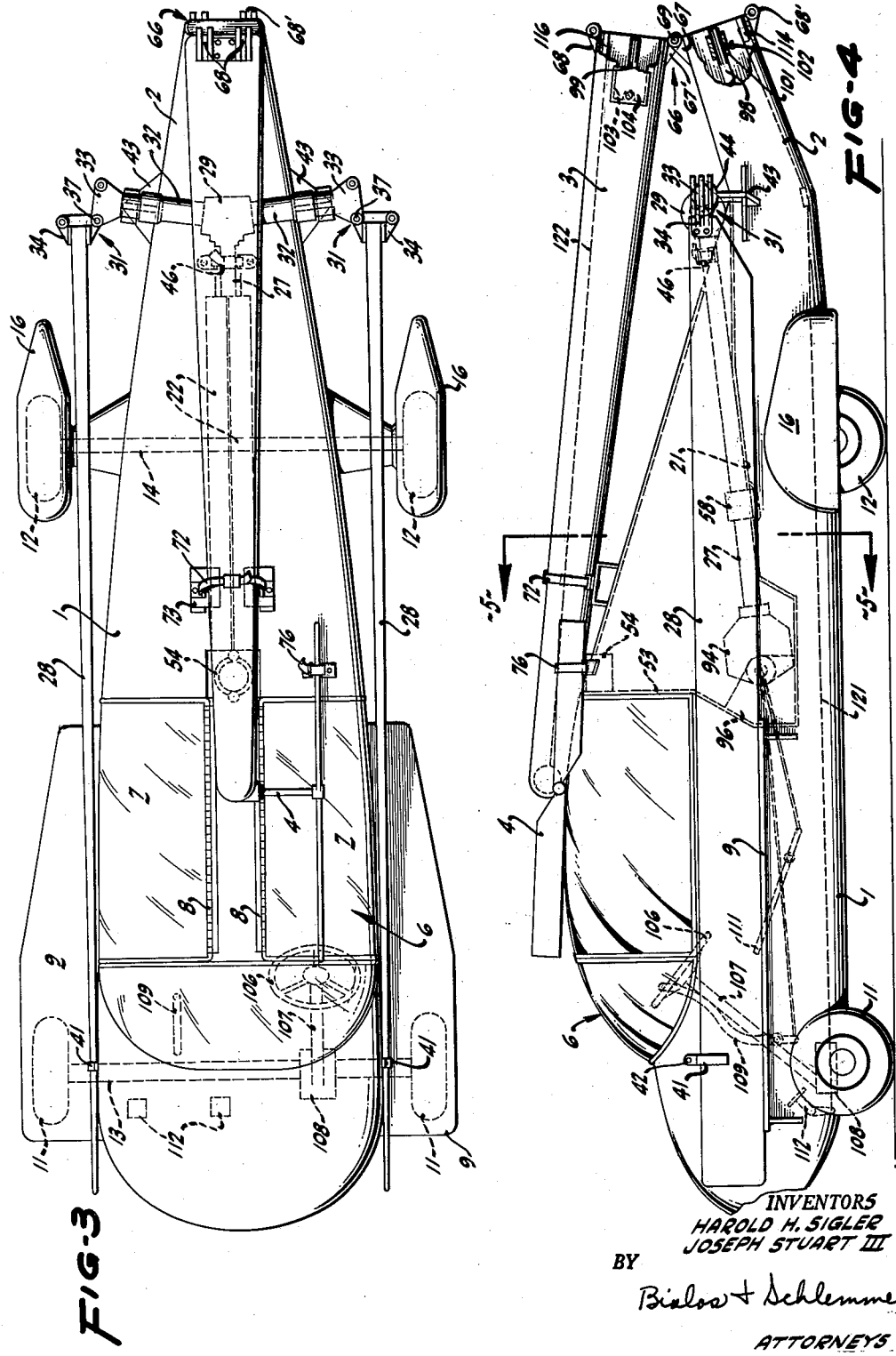

3,116,896
COMBINATION HELICOPTER-AUTOMOBILE
Harold H. Sigler, San Mateo, and Joseph Stuart III, Palo Alto, Calif., assignors, by mesne assignments, to Eltra Corporation, Brooklyn, N.Y., a corporation of New York
Filed Apr. 5, 1961, Ser. No. 101,006
12 Claims. (Cl. 244—2)

This invention relates generally to a transportation vehicle, and more particularly to a combination helicopter-automobile vehicle of a type which is equally well adapted for flight or for movement across the ground in automobile fashion.

When the subject vehicle is to be used in automobile fashion for ground transportation, the components thereof requisite to its helicopter operation are movable to a folded or retracted position, as will be described hereinafter, so that a compact vehicle free of unnecessary length and projections is provided which readily may be accommodated on present day highways and streets. That is, the helicopter components, such as the rotor column and blades and tail boom, are foldable to a retracted position in which the same are compactly maintained relative to the fuselage or body of the vehicle when the same is to be used as an automobile.

An important feature of this invention resides in the method by means of which the vehicle may be rapidly and easily transformed from a helicopter type vehicle to an automobile type vehicle and vice versa.

While in the very broad sense aircraft convertible into automobiles have been contemplated heretofore, such prior varieties of vehicles generally have been very cumbersome and ineffective. In such prior vehicles attention was directed primarily therein to ways of making the wings or tails detachable so that the same could be left at the airport or carried separately from the remainder of the vehicle, to be subsequently reattached to the vehicle when the same was reassembled for flight.

The present invention, however, employs a vehicle in which all the operative components of the vehicle are at all times attached thereto so that the same may be converted from a helicopter to an automobile, and vice versa, rapidly and easily and without undue concern for the location in which the conversion is to be made. Because of the particular construction of the subject vehicle, not only is an operative helicopter embodied therein, but a well performing highway automobile also is included. As a result, and because the subject vehicle when converted for ground operation includes all the necessary automobile features within standard passenger automobile dimensions, the subject vehicle may be flown and landed, converted into an automobile, and driven along conventional highways and streets without complex conversion operations or auxiliary carrying equipment being required. This feature makes the vehicle well adapted for wide spread use and particularly permits the same to be landed on short notice, converted, and driven on the ground during stormy times when flying is unsafe or undesirable. Following weather change to more desirable conditions, the vehicle may be reconverted for flight without any travel time having been lost and without having required special airport facilities.

With the foregoing in mind, objects of the present invention include the provision of a combination helicopter-automobile vehicle; the provision of a method for rapidly and easily converting a helicopter into an automobile, and vice versa; the provision of means in such a vehicle for permitting rapid conversion of the vehicle into a helicopter or automobile as desired; the provision of the novel mounting arrangement for the power source of the vehicle so that the same will not interfere with the helicopter components of the vehicle when such components are positioned for ground operation; and the provision of a novel fuselage or body construction in conjunction with the vehicle which is designed to accommodate the helicopter components when such components are positioned for ground operation.

These and other objects of the invention will become evident from studying the following disclosure, in which reference is directed to the accompanying drawings.

FIG. 1 is a plan view of the subject vehicle arranged for flight operations;

FIG. 2 is a side elevational view of the subject vehicle arranged for flight operations;

FIG. 3 is a plan view of the subject vehicle with the helicopter components thereof foldably positioned for ground operations;

FIG. 4 is a side elevational view of the vehicle with the helicopter components thereof folded for ground operations;

FIG. 5 is a vertical sectional view through the body of the vehicle taken in the plane of line 5—5 of FIG. 4;

FIG. 6 is a partial horizontal sectional view through the subject vehicle taken in the plane of line 6—6 of FIG. 1 and illustrating means for releasably maintaining the rotor column thereof in the upright position for flight;

FIG. 7 is a generally schematic view of means employed for operatively interconnecting the tail rotor of the vehicle with pilot-driver operable tail rotor controls.

As seen in FIGS. 1 through 4, the subject combination helicopter-automobile vehicle comprises a fuselage or body 1 which has operatively connected to the rear end 2 thereof a tail boom 3, on the aft end of which is operatively mounted a conventional torque compensating tail rotor 4. The vehicle body includes a passenger compartment 6 designed to accommodate two or more passengers. Access to the passenger compartment may be had through a pair of hatchways or doors 7 each of which is swingable upwardly about an associated hinge connection 8 extending longitudinally of the body along the top thereof, as best seen in FIG. 3.

Combination splash guards and running boards 9 are provided on opposite sides of the body to provide steps for facilitating access to the hatchways 7 and to deflect any splashing which might occur during ground operation of the vehicle.

Means also is provided for supporting the vehicle on the ground for movement thereacross when the vehicle is being employed as an automobile. Such means comprises a front pair 11 and rear pair 12 of pneumatic wheels mounted on front and rear axles 13 and 14, respectively, for rotation about the axes thereof in the well known fashion. If desired, contoured rear fenders 16 may be provided in conjunction with the rear wheels 12 for the well known automobile purpose, while the aforementioned running boards 9 perform this function with respect to the front wheels 11. The pairs of wheels also provide the requisite landing gear and shock absorbers found desirable during the helicopter operations.

The body 1 of the vehicle is generally hollow and of any suitable reinforced construction capable of withstanding stresses developed in flight and on the ground. However, as perhaps best seen in FIG. 5, the body is provided with an elongated narrow well 21 designed to accommodate components of the vehicle, particularly when the same is readied for ground operation in the manner to be described. Preferably, the top of well 21, which is open to the atmosphere, may be covered by a pair of resilient and flexible covering sheets of rubber or like material bolted, as at 23, or otherwise secured to the body on opposite sides of the longitudinal axis of the well. The inner edges of sheets 22 preferably are in contact with each other as at 24 so that the same may be deflected upwardly or downwardly when vehicle flight components are moved into or removed from the well as will be described. Sheets 22 thereby cooperate to preclude the entry of water and the like into the well when the vehicle is subjected to inclement weather or the like.

The bottom of well 21 desirably is curved or otherwise contoured as at 26 to conform to and provide a seat for the generally circular rotor column 27 of the aircraft. A pair of rotor blades 28 are operatively connected with the rotor column at the upper end thereof by means of a rotor hub 29. As many arrangements are well known by which rotor blades are operatively connected to a rotor column by a rotor hub, details of the blade mounting arrangement will not be described herein. However, by way of example, the subject vehicle may employ a rotor head and blade mounting assembly of the type disclosed in Hiller Jr. et al. Patent No. 2,631,679.

Each of the subject blades is hingedly connected by hinge means 31 to short blade supporting stub shaft sections 32 rotatably projecting from hub 29. Each hinge 31 comprises a first hinge fitting 33 comprising a series of spaced parallel flanges bolted or otherwise secured to the outboard ends of the respective stub shafts 32. Each hinge also includes a second fitting 34 bolted or otherwise secured to the inboard portions of the respective rotor blades which also includes a series of spaced parallel flanges. See FIG. 4.

When the vehicle is in flight condition, the flanges of the respective blade hinge fittings are interengaged and maintained so by a pair of removable pins or bolt type fasteners positioned in aligned apertures through the flanges of the respective hinge fittings.

The combined lengths of the rotor hub 29, stub shafts 32, and hinge fittings 33 desirably correspond generally to the maximum transverse width of the vehicle body 1 so that the rotor blades 28 may be positioned to extend in generally parallel relationship alongside the body on opposite sides of the rotor column 27 when the column is folded as seen in FIG. 3. When it is desired to fold the blades to lie alongside the vehicle body, one of the pin fasteners 37 positioned through the hinge fittings of each blade is removed. By removing such one pin, each blade may be pivoted about the other pin in conventional hinge fashion. Such blade folding may be done following pivotal movement of the rotor column from the upright flight position seen in solid lines in FIG. 2 to the generally horizontal automobile position seen in FIG. 4.

As also seen in FIG. 4, the aforementioned running boards 9 provide means for supporting the outboard ends of the respective blades when the same are folded to lie alongside the vehicle body. Preferably means for holding the blades in the folded position are provided and, in the embodiment illustrated, comprise small brackets 41 pivotally connected to opposite sides of the body adjacent the nose thereof. Each bracket may be rotated about a mounting pin 42 by means of which the same is secured to the body to permit location of the respective blades beneath the brackets.

Means for supporting the upper end of the rotor column and the rotor hub mounted thereon when the column is folded is provided adjacent the rear end 2 of the body. Such means comprises a pair of saddle type brackets 43 (FIGS. 2 and 4) secured to opposite sides of the body by welding or bolting, the upright portions of which are provided with curved supporting plates 44 contoured to receive and seat the stub shafts of the rotor blade assembly when the column is folded. If desired, a buckle type strap 46 or equivalent means may be provided for going around the rotor column to maintain the same in engagement with the saddle brackets when the column is folded. See FIGS. 3 and 4.

Referring now to FIGS. 2 and 6, releasable means 51 is provided for maintaining the rotor column in the upright position when the aircraft is readied for flight. Such means includes a bracket 52 bolted or otherwise secured to an upright frame member 53 of the aircraft body. A pair of cooperable semi-circular clamping plates 54 are hingedly connected at one end by means of a pin 56 to bracket 52. A removable pin 57 is engageable with the other ends of the clamping plates to maintain the same operatively together to form a circular plate construction as seen in solid lines in FIG. 6. Upon removal of pin 57 the plates may be pivoted away from each other about the axis of pin 56 to permit disengagement of the rotor column 27 from the clamping plates so that the column may be pivoted from the upright position.

To permit limited oscillation of the rotor column relative to an upright axis when the column is positioned upright for flight, structure is provided which includes an annular collar 58 surrounding the column in spaced relationship relative thereto. An annular bearing 59 of any suitable construction is operatively engaged with and surrounds the column and it is in such bearing that the column rotates during flight. A series of coil or like spring members 61 are interposed between the collar 58 and the bearing 59 for resiliently maintaining the bearing and the column extending therethrough in a generally concentric position relative to the collar 58. However, the springs may be compressed while the vehicle is in flight to permit limited oscillation of the rotor column as may be desired.

It should be understood that upon removal of pin 57 and pivotal movement of the clamping plates 54 away from each other, the rotor column 27 with bearing 59 and collar 58 positioned therearound may be pivoted to the generally horizontal dotted line position seen in FIG. 4. The collar structure moves with the rotor column in such case.

As also seen in FIG. 6, column 27 preferably is hollow to receive therein means (not shown) for regulating pitch of the rotor blades during flight in a manner well known, such as that described in aforementioned Patent No. 2,631,679.

The tail boom 3 of the aircraft is movably connected to the body adjacent the rear end 2 thereof by hinge means generally designated 66 comprising cooperable interengageable series of upper hinge flanges 67 and 67' and cooperable interengageable series of lower hinge flanges 68 and 68'. A pin 69 preferably extends through aligned apertures and maintains the upper flanges 67 and 67' operatively connected with each other. A pin or bolt 71 is removably extended through the aligned apertures in lower hinge flanges 68 and 68' so that the tail boom may be pivoted about upper pin 69 to the folded position seen in FIG. 4 when pin 71 is removed. When the tail boom is thus pivoted, it is located generally longitudinally of the vehicle body and overlies the top thereof.

Preferably means for maintaining the tail boom in folded relationship relative to the body is provided which may take various forms. In the embodiment illustrated, a belt type strap 72 having its opposite ends secured to a pair of mounting brackets 73 secured atop the body in straddling relationship relative to the well 21 is provided. Desirably a buckle arrangement 74, as seen in FIG. 5, is provided for tightening the strap around the folded tail boom.

When the tail boom is folded, the tail rotor 4 is positioned to overlie a portion of the passenger compartment 6, as seen in FIG. 3. Desirably, another strap 76 also is secured to the vehicle top for holding down the blades of the tail rotor during ground operation.

The drive means to be described hereinafter for effecting rotation of the tail rotor during flight is separable intermediate its opposite ends in a manner to be described so that such drive means will not preclude folding of the tail boom as described.

Referring now to FIG. 1, the power source for propelling the vehicle during flight and ground operations comprises an engine 81 of any suitable construction. Such engine may be of the well known internal combustion type or, alternatively a free turbine engine may be employed.

An important feature of this invention resides in the positioning of the power source 81 in the body. That is, as seen in FIG. 1, engine 81 is offset laterally relative to the longitudinal axis 82 of the body. Because, as also seen in FIG. 1, the rotor column 27 preferably is mounted in the plane of the longitudinal axis of the vehicle body so that the column axis corresponds generally with the body axis, by offsetting the engine relative to such body axis, the rotor column may be pivoted as described previously without interference from the engine.

The engine 81 is operatively but disengageably connected to the wheel transmission 86 of the vehicle by means of a selectively engageable clutch 87 as generally shown in FIG. 1. Other clutch means also are provided in conjunction with the engine for selectively disengaging the rotor column and the tail rotor from the engine when the vehicle is intended for ground operation. Such other clutch means includes a second clutch 88 which is interposed between the engine and the transmission 89 for the rotor column, and a third clutch 91 which is interposed between the engine and the drive shaft 92 for the tail rotor.

By the provision of suitable and well known controls (not shown) operable by the pilot-driver, the clutches 88 and 91 may be selectively and simultaneously engaged to direct power from the engine to both the tail rotor and rotor column during flight operation, while at such time the clutch 87 may be disengaged from the wheel transmission 86. For automobile operation, clutch 87 is selectively employed to engage wheel transmission 86 with the engine while clutches 88 and 91 are disengaged so that the rotor column and tail rotor are stationary.

With respect to the rotor column, the transmission 89 described previously is operatively connected by a drive shaft 93 (FIG. 1) to the gear arrangement located in gear box housing 94 at the base of the rotor column as seen in FIGS. 2 and 4. It is about the axis of shaft 93 that the rotor column is pivotable as described previously.

The gear box 94 may be journaled in mounting plates 96 welded, bolted or otherwise secured to the aforementioned frame member 53 so that the gear box is pivotable with the rotor column about the axis of shaft 93. With this arrangement, there is no need to disengage the rotor column from the gear box when the column is pivoted.

As mentioned previously, the tail rotor drive shaft 92 preferably is provided with means for detachably interconnecting the forward section 98 of such shaft with the rear section 99 thereof, as seen in FIG. 4. Such interconnecting means includes a collar 101 slidable on the drive shaft which is internally splined to mate with the externally splined adjacent ends of the two drive shaft sections. A set screw or other suitable means 102 is provided in conjunction with the collar for maintaining the same in a predetermined position on the shaft. If it is desired to interconnect the two sections of the drive shaft when the tail boom is positioned for flight, it is merely necessary to position the collar to lie part way over each of the adjacent ends of the drive shaft sections and to secure the set screw against the drive shaft to preclude movement of the collar. The collar thereby will transmit rotary movement from forward section 98 of the shaft to rear section 99 thereof.

An aperture 103 is provided in the side of the tail boom to permit access to the interior thereof so that connection and disconnection of the drive shaft sections may be effected. A removable cover plate 104 preferably is secured by screws or the like over such aperture when the vehicle is ready for flight.

Control of the vehicle during ground or flight operation desirably is effected by conventional mechanisms intended for that purpose, which are well known. Desirably, essentially separate sets of controls are provided for regulating operation of the vehicle when the same is on the ground and in flight. For example, as generally schematically seen in FIG. 4, conventional steering apparatus including a steering wheel 106 operatively connected by steering column 107 to conventional steering mechanism 108 engaged with the front axle 13 of the vehicle may be provided. Similarly, conventional throttle controls of the well known automobile type (not shown) may be provided for regulating operation of the engine 81 when the vehicle is moving along the ground.

Also, a helicopter control stick 109 for regulating cyclic pitch of the rotor blades and a second control stick 111 for regulating collective pitch of the rotor blades may be operatively connected to the rotor column in the well known manner. Similarly, pedal controls 112 are operatively connected by a suitable control cable arrangement, to be described, to the tail rotor of the aircraft for modifying blade pitch. In this latter regard, so that the tail rotor control may be disengaged when the tail boom is folded, automatically engageable and disengageable mechanism is provided for this purpose. That is, as seen in FIG. 4 and generally schematically in FIG. 7, a pair of curved rocker arms 114 and 116 are pivotally mounted in the forward and rear tail boom sections respectively by mounting pivot pins 117 and 118 respectively provided for this purpose. It should be understood that when the tail boom is positioned to extend rearwardly of the body for flight operation, the convex surface of rocker arm 116 will be slidably engaged with the concave surface of rocker arm 114 so that pivotal movement of arm 114 will transmit pivotal movement to arm 116. However, because the respective rocker arms are mounted on opposite sides of the hinge connection between the forward and rear tail boom sections, upon pivotal movement of the tail boom to the folded position shown, the rocker arms will be automatically disengaged, and will be automatically re-engaged when the tail boom is moved from the folded to the extended position.

Opposite ends of rocker arm 114 as connected by a pair of cables 121 to the respective pilot operable control pedals 112, while opposite ends of rocker arm 116 as connected by a pair of control cables 122 to mechanism 123 for varying the pitch of the blades of the tail rotor 4 in the well known manner. As a result, upon depressing a predetermined one of the control pedals 112, when the tail boom is positioned for flight, rocker arm 114 will be pivoted about pin 117 in a predetermined direction to thereby cause corresponding pivotal movement of rocker arm 116 about pin 118 to effect, through cables 122, a change in the pitch of the tail rotor blades.

Because of the automatic engage-disengage feature of the tail rotor control mechanism thus provided, no separate operation need be carried out to ready the tail rotor for operation when the tail boom is located in the position for flight.

In the embodiment illustrated, it is contemplated that rotor column 27 will be manually moved between the upright and generally horizontal positions shown. However, it should be understood that, if desired, suitable hydraulic or electrical means could be incorporated with the vehicle to effect the rotor column pivoting operation automatically. Similarly, means for maintaining the rotor column upright for flight could be automatically regulated by a suitable pilot-driver control.

To convert the vehicle from the condition seen in FIGS. 1 and 2 for flight to the condition seen in FIGS. 3 and 4 for ground operation, the following simple method and procedure is employed. After the rotor blades have stopped rotating, the blades are positioned to extend transversely of the longitudinal axis of the body. Thereafter, upon disengagement of the rotor column from the collar structure 54 described, the rotor column may be pivoted rearwardly to the generally horizontal position seen in FIG. 4. Following such rearward pivotal movement, the appropriate pin is removed from the hinge means of the respective rotor blades and such blades are pivoted forwardly to lie on opposite sides of the vehicle body, in which position they are maintained by brackets 41. Thereafter, upon removing access plate 104, the forward and rear sections of the rotor drive shaft are disconnected by slidably moving collar 101 to the position seen in FIG. 4. Upon removing hinge pin 71, the tail boom may be pivoted upwardly over the body about the axis of pin 69. When the boom has thus been positioned, the boom and tail rotor blades are held down by the means described previously.

Upon the pilot-driver operating the appropriate clutch control, power may be diverted from the rotor column and tail rotor and applied by the engine to the wheel transmission 86 so that the vehicle may be driven as a conventional automobile.

When it is desired to reconvert the vehicle into a helicopter, the above procedure is merely reversed, with the selective pilot-driver clutch control being employed to selectively disengage the wheel transmission and for again operatively engaging the tail rotor and rotor column with the engine.

An important feature of this invention, as noted previously, resides in the provision of separate control stations, with accompanying separate controls located thereat, for accommodating the vehicle pilot when the same is to be flown as a helicopter and for accommodating the vehicle driver when the same is to be driven on the ground as an automobile. By thus providing separate pilot-driver control stations, the need for providing a single set of complicated integrated controls capable of performing both flight and automobile control functions is precluded. That is, the aforementioned separate conventional helicopter type controls for flight operation are provided at the right hand pilot station, as seen in FIGS. 3 and 4, while the aforementioned separate automobile type steering and other conventional automobile controls are provided at the left hand driver station. Preferably, the pilot-driver clutch control is located between the two stations so as to be readily accessible from each station.

While to simplify illustration, other well known automobile components have not been illustrated in conjunction with the subject vehicle, such as head lights, mirrors, turn signals, fuel tank, luggage compartment, and so forth, it should be understood that such conventional components are contemplated for use with this vehicle, and that the same may be applied thereto as found desirable.

Having thus made a full disclosure of a preferred embodiment of this invention, reference is directed to the appended claims.

We claim:

1. A combination helicopter-automobile vehicle comprising a body, wheels depending from said body for supporting said vehicle for movement on the ground, a rotor column pivotally mounted in said body to be selectively positioned generally upright relative to said body for flight operation and substantially horizontal relative to said body for ground operation, rotor blades operatively connected by hinge means with said rotor column, said blades being foldable generally longitudinally of said column when said column is generally horizontally positioned, a tail boom pivotally connected by hinge means with said body and having a torque compensating tail rotor operatively connected therewith, said boom being selectively positionable to extend rearwardly from said body for flight operation and foldable relative to said body about said last mentioned hinge means for ground operation, an engine mounted in said body, and means operatively and selectively connecting said engine with said rotor column and tail rotor for driving the same for flight operation and with said wheels for driving the same for ground operation, said last mentioned means including a detachable connection interposed between said engine and said tail rotor for operatively disconnecting said tail rotor from said engine when said tail boom is folded.

2. The vehicle of claim 1 in which the plane of the longitudinal axis of said rotor column corresponds generally with the plane of the longitudinal axis of said body, and in which said engine is positioned in offset relationship relative to said body axis, whereby said column is free of interference from said engine when said column is pivoted to the generally horizontal position for ground operation.

3. The vehicle of claim 1 in which said body is provided with an elongated well to accommodate said rotor column when the same is pivoted to said generally horizontal position.

4. The vehicle of claim 1 which includes pilot-driver operable control means operatively connected with said tail rotor when said vehicle is ready for flight for selectively changing the pitch of the blades of said tail rotor, said control means including mechanism for automatically operatively disengaging such means from said tail rotor as said tail boom is folded, and vice versa.

5. A combination helicopter-automobile vehicle which in the condition for movement on the ground comprises a body, wheels supporting said body for movement on the ground, an engine for driving said vehicle over the ground, a rotor column having a plurality of rotor blades operatively connected by hinge means therewith, said rotor column being pivotally mounted in said body and positioned to lie generally horizontally and extending generally longitudinally of said body, said blades being folded about said hinge means and extending longitudinally of said body on opposite sides of said column, a tail boom which has a tail rotor thereon connected by hinge means to said body, said boom being folded about said last mentioned hinge means and extending generally longitudinally of said body, a drive shaft operatively connected with said tail rotor, means for operatively connecting said drive shaft with said engine when said tail boom is positioned to extend rearwardly of said body for flight, and clutch means operatively connecting said wheels with said engine and for selectively disengaging said wheels therefrom and for engaging said rotor column and tail rotor therewith when said vehicle is readied for flight.

6. The vehicle of claim 5 which includes pilot-driver operable control means for varying the pitch of said tail rotor when said vehicle is ready for flight, and in which said control means includes mechanism for automatically operatively connecting said tail rotor with said means when said tail boom is pivoted to extend rearwardly of said body for flight.

7. The aircraft of claim 5 in which said engine is offset laterally relative to the longitudinal axis of said body, and in which said rotor column is pivotally movable generally in the pane of said axis, whereby said engine does not interfere with pivotal movement of said column.

8. A combination helicopter-automobile vehicle comprising a fuselage body which is free of fixed supporting wings projecting laterally therefrom for sustaining said vehicle in flight, means for supporting said body for movement on the ground, a rotor column projectable generally upright relative to said body, means mounting said rotor column for pivotal movement between a generally upright projected position and a generally horizontal retracted position in which said column is positioned to lie generally longitudinally of said body, means for releasably maintaining said column in said upright position and permitting movement thereof when released to said retracted generally horizontal position, rotor blades operatively and hingedly connected with said column and hingedly foldable axially thereof relative thereto to extend generally longitudinally of said body when said column is in said retracted position, and power means selectively and operatively connectable with said rotor blades for positively rotating said blades above said body when said column is in said upright position so that said vehicle may be flown as a helicopter and with said ground supporting means when said column is in said retracted position so that said vehicle may be driven as an automobile.

9. A combination helicopter-automobile vehicle comprising a fuselage body which is free of fixed sustaining wings projecting laterally therefrom for sustaining said vehicle in flight, a tail boom section extending rearwardly from said body having a tail rotor mounted thereon, means hingedly connecting said tail boom to said body whereby said boom may be folded relative to said body, a rotor column projectable generally upright from said body, means mounting said rotor column for pivotal movement between a generally upright projected position and a generally horizontal retracted position in which said column is positioned to lie generally longitudinally of said body, means for releasably maintaining said column in said upright position and permitting pivotal movement thereof when released to said retracted generally horizontal position, rotor blades operatively and hingedly connected with said column and hingedly foldable axially thereof relative thereto to extend generally longitudinally of said body when said column is in said retracted position, means for supporting said vehicle for movement on the ground, power source means selectively and operatively connectable with said rotor blades and said tail rotor for positively driving said rotor blades and said tail rotor when said vehicle is in flight and with said ground supporting means when said vehicle is on the ground, and control means connected with said tail rotor for regulating pitch thereof during flight, said control means being operatively disengageable from said tail rotor when said tail boom is folded.

10. A combination helicopter-automobile vehicle which in the condition for movement on the ground comprises a body, wheels supporting said body for movement on the ground, means operatively and selectively disengageably connected with said wheels for driving the same, a rotor column having a plurality of rotor blades connected by hinge means therewith, means pivotally mounting said rotor column in said body, said column being positioned to lie generally longitudinally of said body, disengaged means for operatively and selectively connecting said rotor column with said means for driving said wheels, said blades being folded about said hinge means to extend generally longitudinally of said body on opposite sides of said column, a tail boom having a tail rotor thereon hingedly connected with said body, said tail boom being folded to overlie said body, and other disengaged means for operatively and selectively connecting said tail rotor with said means for driving said wheels when said tail boom is pivoted to extend rearwardly of said body.

11. The vehicle of claim 10 in which said means for driving said wheels comprises an engine mounted in offset relationship relative to the longitudinal axis of said body, said column being pivotally connected to said body for movement substantially in the plane of said axis, said engine and column being free of interference with each other when said column is pivotally moved relative to said body.

12. The vehicle of claim 10 which includes means for releasably maintaining said rotor column in a generally upright position when said vehicle is converted for flight.

References Cited in the file of this patent
UNITED STATES PATENTS

| | | |
|---|---|---|
| 1,731,757 | Tubbe | Oct. 15, 1929 |
| 2,052,086 | Dornier | Aug. 25, 1936 |
| 2,110,563 | Thaon | Mar. 8, 1938 |
| 2,135,073 | Gerhardt | Nov. 1, 1938 |
| 2,562,491 | Hall | July 31, 1951 |
| 2,751,990 | Finlay et al. | June 26, 1956 |

UNITED STATES PATENT OFFICE
CERTIFICATE OF CORRECTION

Patent No. 3,116,896            January 7, 1964

Harold H. Sigler et al.

It is hereby certified that error appears in the above numbered patent requiring correction and that the said Letters Patent should read as corrected below.

Column 1, line 44, for "withount" read -- without --; column 7, line 75, for "light" read -- flight --; column 8, line 58, for "pane" read -- plane --; column 10, line 12, for "haivng" read -- having --; line 13, for "hingdely" read -- hingedly --.

Signed and sealed this 16th day of June 1964.

(SEAL)
Attest:

ERNEST W. SWIDER                           EDWARD J. BRENNER
Attesting Officer                             Commissioner of Patents